(12) United States Patent
Shirai et al.

(10) Patent No.: US 8,669,851 B2
(45) Date of Patent: Mar. 11, 2014

(54) RADIO COMMUNICATION MODULE, REMOTE CONTROLLER, AND RADIO SYSTEM

(75) Inventors: Shinichiro Shirai, Chiba (JP); Paul Murphy, Tokyo (JP)

(73) Assignee: SMK Corporation, Tokyo (JP)

( * ) Notice: Subject to any disclaimer, the term of this patent is extended or adjusted under 35 U.S.C. 154(b) by 587 days.

(21) Appl. No.: 12/960,251

(22) Filed: Dec. 3, 2010

(65) Prior Publication Data

US 2011/0285513 A1 Nov. 24, 2011

(30) Foreign Application Priority Data

May 24, 2010 (JP) ................................. 2010-118777

(51) Int. Cl.
*G08C 19/16* (2006.01)
*G06F 3/041* (2006.01)

(52) U.S. Cl.
USPC ......................................... 340/12.5; 345/173

(58) Field of Classification Search
None
See application file for complete search history.

(56) References Cited

U.S. PATENT DOCUMENTS

| | | | |
|---|---|---|---|
| 2003/0067890 A1* | 4/2003 | Goel et al. | 370/310.1 |
| 2008/0143551 A1 | 6/2008 | Otsuka et al. | |
| 2009/0231296 A1* | 9/2009 | Besshi | 345/173 |
| 2010/0014004 A1* | 1/2010 | Dai | 348/734 |
| 2010/0107029 A1* | 4/2010 | Kikuchi et al. | 714/748 |

FOREIGN PATENT DOCUMENTS

| JP | 2008-153840 A | 7/2008 |
|---|---|---|
| JP | 2010-109530 A | 5/2010 |

OTHER PUBLICATIONS

Applicants bring the attention of the Examiner to the following pending U.S. applications; U.S. Appl. No. 12/958,335, filed Dec. 1, 2010 and U.S. Appl. No. 12/958,336, filed Dec. 1, 2010.

\* cited by examiner

*Primary Examiner* — Brian Zimmerman
*Assistant Examiner* — Cal Eustaquio (57) ABSTRACT

A radio remote controller precisely transfers user's intended control. A radio communication module transmits control data for controlling a controlled device by radio communications to provide remote control to the controlled device. The radio communication module includes a communication control section, and a communication section. The communication control section creates transmission data by adding repeat information to the control data to be transmitted to the controlled device, with the repeat information being indicative of whether to repeatedly control a function of the controlled device controlled by the control data. The communication section successively outputs the transmission data created by the communication control section via a radio signal.

14 Claims, 5 Drawing Sheets

RADIO COMMUNICATION MODULE, REMOTE CONTROLLER, AND RADIO SYSTEM

The contents of the following Japanese patent application is incorporated herein by reference, NO. 2010-118777 filed on May 24, 2010.

BACKGROUND

1. Technical Field

The present invention relates to a radio communication module, a remote controller, and a radio system.

2. Related Art

Known RF communication modules provide remote control through radio communications to controlled devices that are controlled by infrared communications (for example, see Japanese Patent No. 4283305).

When an RF remote controller transmits control data to a controlled device by RF communications to provide remote control thereto, an RF signal from the RF remote controller cannot be received correctly by the controlled device in some cases due to the presence of external noise on the RF communications. This increases a delay time from transmission of control data transmitted immediately before even if the controlled device receives the control data re-transmitted from the RF remote controller. If an interval is made between receipt of successive control data, the controlled device may determine that a user operated the remote controller twice. As such, the RF remote controller may cause the controlled device not to be able to properly receive the RF signal. Accordingly, in some cases, user's instructions cannot be transferred correctly to the controlled device.

SUMMARY

To solve the aforementioned problems, one aspect of the invention provides a radio communication module for sending control data for controlling a controlled device by radio communications to provide remote control to the controlled device. The radio communication module may include: a communication control section for creating transmission data by adding repeat information to the control data to be transmitted to the controlled device, the repeat information being indicative of whether to repeatedly control a function of the controlled device controlled by the control data, and a communication section for successively outputting the transmission data created by the communication control section via a radio signal.

The radio communication module may further include a repeat information storage section in which the repeat information is stored in advance in association with the function of the controlled device. The communication control section may create the transmission data by adding the repeat information to the control data to be transmitted to the controlled device with the repeat information being stored in the repeat information storage section in association with the function controlled by the control data.

The communication control section may create transmission data by adding repeat information, indicating that no repeated control is allowed, to the control data for providing toggle control to a function of the controlled device. The communication control section may create transmission data by adding repeat information, indicating that no repeated control is allowed, to the control data for providing toggle control to a power of the controlled device.

The radio communication module may further include a transmission buffer for storing therein the transmission data. In order to re-transmit the transmission data to the controlled device, the communication control section may cause the communication section to output the transmission data stored in the transmission buffer via a radio signal.

The communication section may also receive a response signal from the controlled device indicating that the controlled device received the control data. When the response signal is not received, the communication control section may cause the communication section to re-deliver via a radio signal the transmission data stored in the transmission buffer until the response signal is received.

When the response signal is not received and in the condition that a period of time during which the response signal is not received does not exceed a predetermined value, the communication control section may cause the communication section to re-deliver the transmission data stored in the transmission buffer via a radio signal until the response signal is received. When the period of time during which the response signal is not received exceeds the predetermined value, the communication control section may cause the communication section to output via a radio signal new transmission data created from new control data.

When the period of time during which the response signal is not received exceeds the predetermined value, the communication control section may cause the communication section to output the new transmission data via a radio signal with the transmission data stored in the transmission buffer.

The radio communication module may further include a data buffer for buffering one or more pieces of new control data to be transmitted from when the control data is output until the response signal is received. When the response signal is received from the controlled device, the communication control section may create transmission data containing a collection of the one or more pieces of new control data stored in the data buffer and the repeat information, and then cause the communication section to output the resultant transmission data via a radio signal.

When a plurality of pieces of new control data are stored in the data buffer, the communication control section may create transmission data by collecting the plurality of pieces of new control data to each of which the repeat information is added, and then may cause the communication section to output the resultant transmission data via a radio signal.

The communication control section may create one-packet transmission data containing the plurality of pieces of new control data and the repeat information as a payload, and then may cause the communication section to output the resultant transmission data via a radio signal.

A second aspect of the present invention provides a remote controller that may include the aforementioned radio communication module, and an input section for receiving a user input. The communication control section creates the transmission data by adding the repeat information to the control data corresponding to the user input.

The input section may include a plurality of key sections operated by a user and which are associated with a plurality of functions of the controlled device. When a user operates at least any one of the plurality of key sections, the communication control section may create the transmission data by adding the repeat information, set in advance for the function associated with the operated key section, to the control data corresponding to the key section.

A third aspect of the present invention provides a radio system that may include a first radio communication module, and a second radio communication module which is the aforementioned radio communication module in radio communication with the first radio communication module. The first radio communication module includes a first communication section for receiving a radio signal from the communication section, and a first communication control section for extracting the transmission data on the basis of the radio signal received by the first communication section.

The first radio communication module may further include an output section for outputting control data contained in the extracted transmission data in a control processor included in the controlled device. When a period of time from when a first radio signal is received until a second radio signal is newly received from the communication section exceeds a predetermined length and in the condition that control data contained in first transmission data extracted from the first radio signal and control data contained in second transmission data extracted from the second radio signal indicate the same substance of control, and that repeat information contained in the second transmission data indicates that no repeated control is allowed, the first communication section prohibits output of the control data contained in the second transmission data from the output section.

Note that the aforementioned summary of the invention covers not all the features that are necessary for the present invention. Sub-combinations of these feature groups may also form the invention.

DESCRIPTION OF EXEMPLARY EMBODIMENTS

Hereinafter, some embodiments of the present invention will be described. These embodiments are not intended to limit the scope of the invention as set forth in the appended claims. It is also to be understood that all the combinations of the features described in the embodiments are not always necessary to solve the problems according to the invention.

Figure 1:
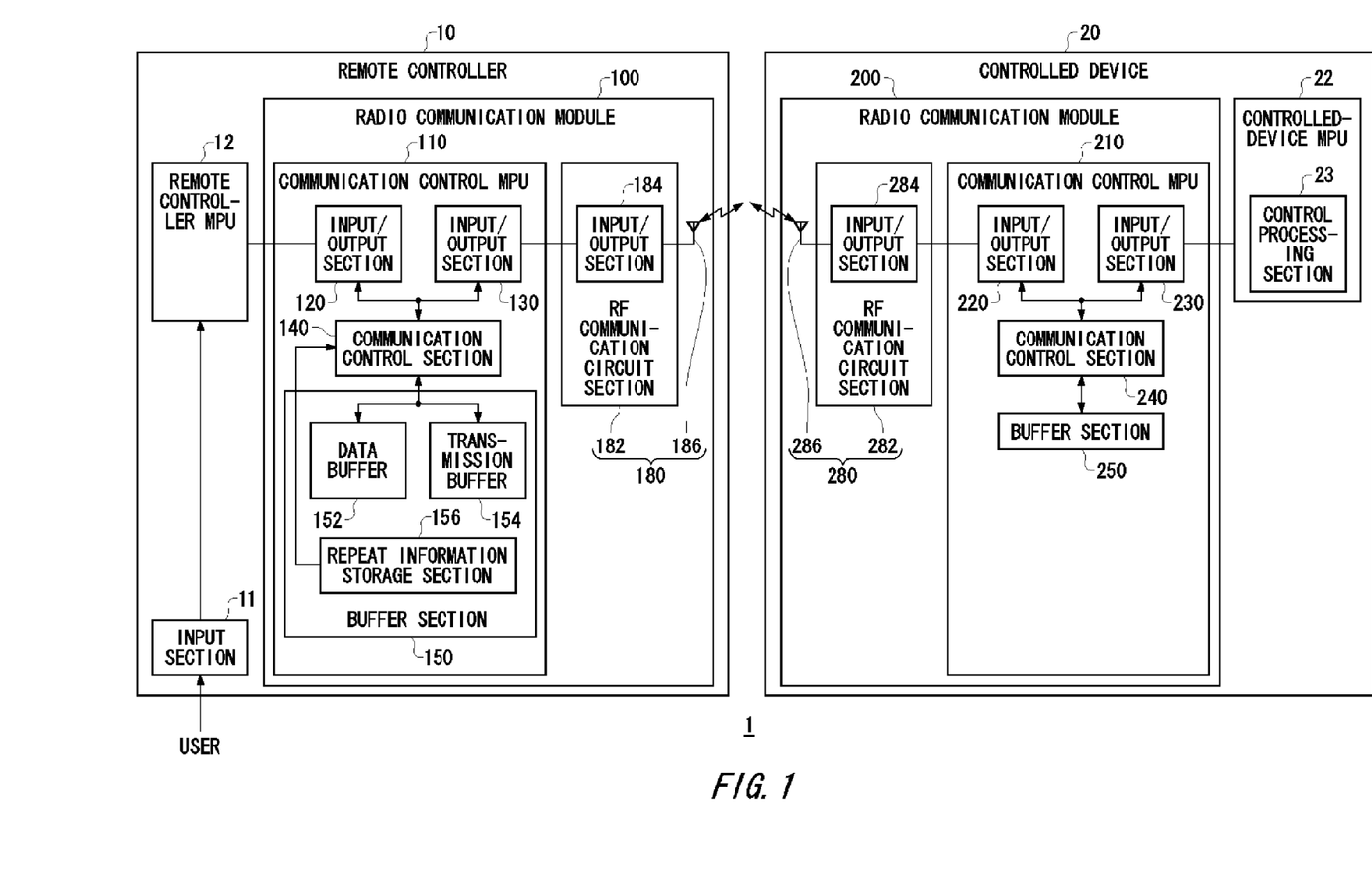
FIG. 1 shows an exemplary block diagram of an RF communication system 1 according to an embodiment.

FIG. 1 is an exemplary block diagram of an RF communication system 1 according to an embodiment. The RF communication system 1 includes a remote controller 10 and a controlled device 20, which are in radio communicate with each other. The remote controller 10 causes the control data indicative of a control instruction by the user to be sent to the controlled device 20 by radio communication, thereby providing remote control to the controlled device 20. By way of example, the radio communication between the remote controller 10 and the controlled device 20 is carried out in conformity with short-range radio communication standards such as ZigBee (trade mark).

For example, the controlled device 20 may include audio-visual systems such as television sets or audio devices; electronic information processing devices such as personal computers; electric home appliances such as air conditioners, lighting apparatuses, and refrigerators; or driving devices for doors, windows, or blinds of houses. The remote controller 10 may be a dedicated device for remote control. The function of the remote controller 10 may be performed by the cellular phone terminal, in which the remote control function has been incorporated, or by the portable terminal such as PDAs.

The remote controller 10 includes an input section 11, a remote controller MPU 12, and a radio communication module 100. The input section 11 receives user inputs. More specifically, the input section 11 has a key section for receiving user inputs. For example, the input section 11 has a key section which is associated with the plurality of functions of the controlled device 20 and on which the user operates. The key section may be plural in number, in the case of which each section can be associated with the respective functions to be controlled by remote control. When a particular one of the plurality of key sections is operated by the user, the remote controller MPU 12 creates control data corresponding to the operated key section. The remote controller MPU 12 supplies the produced control data, for example, as UART data through an output port to the radio communication module 100.

The input section 11 may be any input device on which the user can input one or more control instructions not necessarily through key inputs. For example, the input section 11 can be implemented with the touch panel. The input section 11 realized as the touch panel can receive different control instructions by assigning control commands to each of a plurality of different regions on the touch panel. The touch panel can also function as a display section for displaying the indicator of a user input or the result of input control. The display section may also be provided as a separate display device on a region different from the user input region.

The radio communication module 100 has an input/output section 120, an input/output section 130, a communication control section 140, a buffer section 150, and a communication section 180. The communication section 180 includes an RF communication circuit section 182, and an antenna section 186. The buffer section 150 includes a data buffer 152, a transmission buffer 154, and a repeat information storage section 156. By way of example, the input/output section 120, the input/output section 130, the communication control section 140, and the buffer section 150 are realized in a communication control MPU 110.

The input/output section 120 has, by way of example, a UART interface to receive UART data supplied from the remote controller MPU 12. The communication control section 140 uses the UART data entered into the input/output section 120 to create an RF packet to be sent via an RF signal from the remote controller 10. The communication control section 140 creates the RF packet using the buffer section 150 to be detailed later.

Note that a UART packet that contains at least the UART data entered at the input/output section 120 is to be included as payload in the RF packet. For example, the communication control section 140 may produce a UART packet by attaching additional data to the UART data entered at the input/output section 120, thereby creating the RF packet that contains the produced UART packet as a payload.

The communication control section 140 outputs the produced RF packet to the RF communication circuit section 182 via the input/output section 130. The input/output section 130 may be a serial bus such as the serial peripheral interface.

The RF communication circuit section 182 has an input/output section 184 to input and output data into and from the input/output section 130. When an RF packet is input into the input/output section 184 from the input/output section 130, the RF communication circuit section 182 creates a modulated signal that is modulated with each bit stream of data of the RF packet to provide the signal to the antenna section 186. The antenna section 186 sends the signal into space as an RF signal in one of the channels in the 2.4 GHz band.

The controlled device 20 includes a controlled-device MPU 22 and a radio communication module 200. The radio communication module 200 has an input/output section 220, an input/output section 230, a communication control section 240, a buffer section 250, and a communication section 280. The communication section 280 includes an RF communication circuit section 282, and an antenna section 286. By way of example, the input/output section 220, the input/output section 230, the communication control section 240, and the buffer section 250 are realized in a communication control MPU 210.

Here, the radio communication module 200 and the radio communication module 100 can be implemented in the same hardware configuration. The respective functions of the radio communication module 100 and the radio communication module 200 may be implemented in software by at least one of a program running on the radio communication module 100 or data supplied to the program running on the radio communication module 100.

In the foregoing, a description was briefly made to the operation of the radio communication module 100 sending an RF signal when the radio communication module 100 was incorporated to operate in the remote controller 10. Now, a description will be briefly made to the operation of the radio communication module 200 receiving an RF signal when the radio communication module 200 is incorporated to operate in the controlled device 20.

The RF communication circuit section 282 has an input/output section 284 to input and output data into and from the input/output section 230. The RF signal received by the antenna section 286 via space is demodulated at the RF communication circuit section 282 to produce an RF packet. The produced RF packet is delivered to the input/output section 220 via the input/output section 284.

The communication control section 240 creates control data from the RF packet entered into the input/output section 220 at the input/output section 284 and then outputs the resulting data to the controlled-device MPU 22 via the input/output section 230. For example, the communication control section 240 extracts control data as UART data from the UART packet that is contained in the RF packet as a payload.

When the controlled-device MPU 22 can receive the UART data, the communication control section 240 outputs the control data as the extracted UART data to the controlled-device MPU 22 via the UART interface that the input/output section 230 has. When the controlled-device MPU 22 can receive a PWM modulated signal, the communication control section 240 outputs the PWM modulated signal obtained by a PWM modulation with the extracted control data to the controlled-device MPU 22 through the PWM output interface that the input/output section 230 has. The control processing section 23 controls the function of the controlled device 20 in accordance with the control data supplied as the UART data or the PWM modulated signal to the controlled-device MPU 22.

When the controlled device 20 is an audio device, the controlled device 20 includes, for example, the function that the audio device has to control the increase or decrease of the output volume. When the controlled device 20 is a video device, the controlled device 20 includes, for example, the function that the video device has to control output video image. The output video control may include, for example, the control of displayed contents or the image quality control such as the brightness or contrast of output video images. The control of displayed contents may include, for example, the control for switching to display the menu. Furthermore, when the controlled device 20 is a device having a tray on which an external recording medium such as a DVD or CD-ROM is placed, the controlled device 20 includes, for example, the control function for closing and opening the tray. Furthermore, the controlled device 20 has, for example, the control function for turning ON/OFF the power of the controlled device 20.

As described above, the remote controller 10 serves as the transmission side for transmitting the RF signal, while the controlled device 20 acts as the reception side for receiving the RF signal. On the other hand, when the controlled device 20 sends the RF signal to the remote controller 10, the radio communication module 200 can send the RF signal in the same manner as the aforementioned radio communication module 100 does. In this case, the radio communication module 100 can receive the RF signal in the same manner as the aforementioned radio communication module 200 does, thereby extracting the data delivered as the RF signal from the radio communication module 200.

Figure 2:
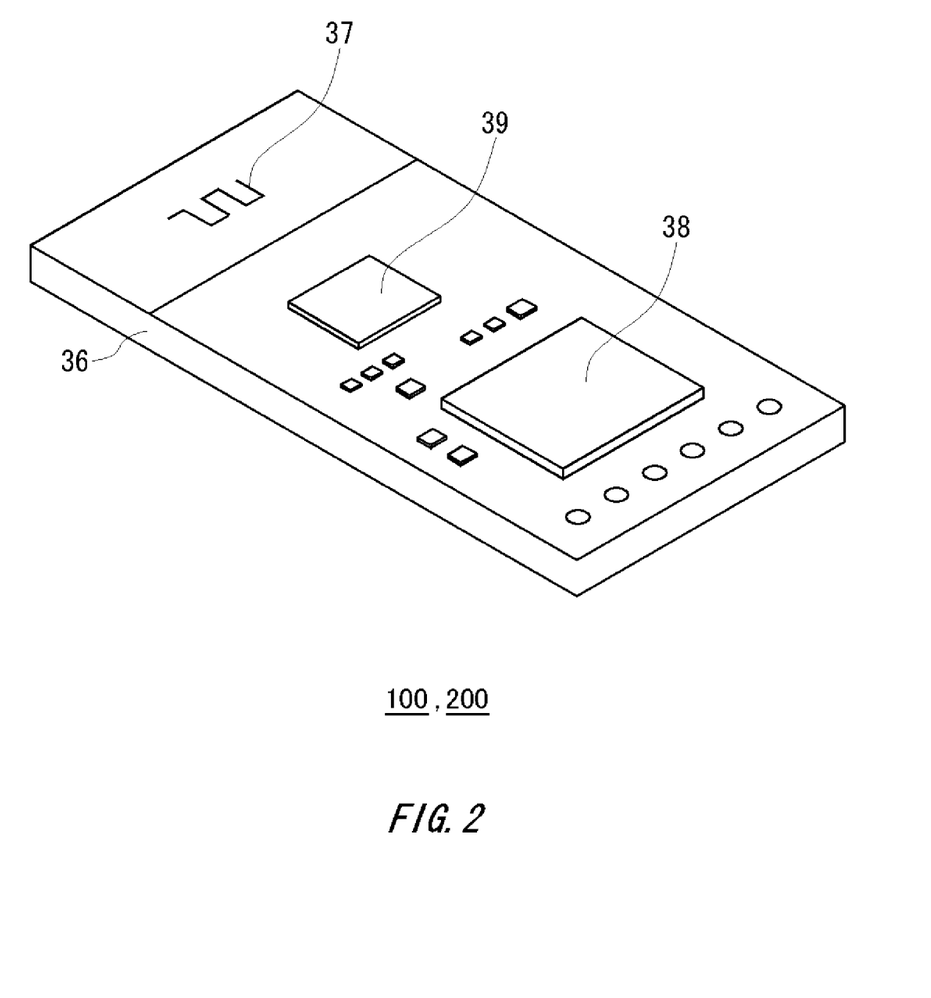
FIG. 2 shows a view illustrating an exemplary outer appearance of a radio communication module 100.

FIG. 2 is a view illustrating an exemplary outer appearance of the radio communication module 100. The radio communication module 100 has a circuit board 36, an antenna 37, a communication control MPU 38, and an RF communication IC chip 39. The antenna 37, the communication control MPU 38, and the RF communication IC chip 39 are examples of the antenna section 186, the communication control MPU 110, and the RF communication circuit section 182, respectively. As described above, since the radio communication module 100 and the radio communication module 200 can be configured in the same hardware structure, the radio communication module 200 can be implemented as illustrated in the figure.

The board 36 may be a printed circuit board. The antenna 37 may be a printed antenna formed by a patterned conductor printed for wiring on the board 36. The antenna 37 may be provided on a certain region of the surface of the board 36, while the communication control MPU 38 and the RF communication IC chip 39 may be implemented on another region on the active surface. The antenna 37 radiates data as a radio signal into space in the form of radio waves. Furthermore, the antenna 37 can detect radio waves in the air, thereby receiving the data of the radio signal. As such, the antenna 37 functions as a transmit/receive antenna. In the present embodiment, what is meant by the RF signal being output is that the RF signal is radiated from the antenna 37 in the form of radio waves.

Figure 3:
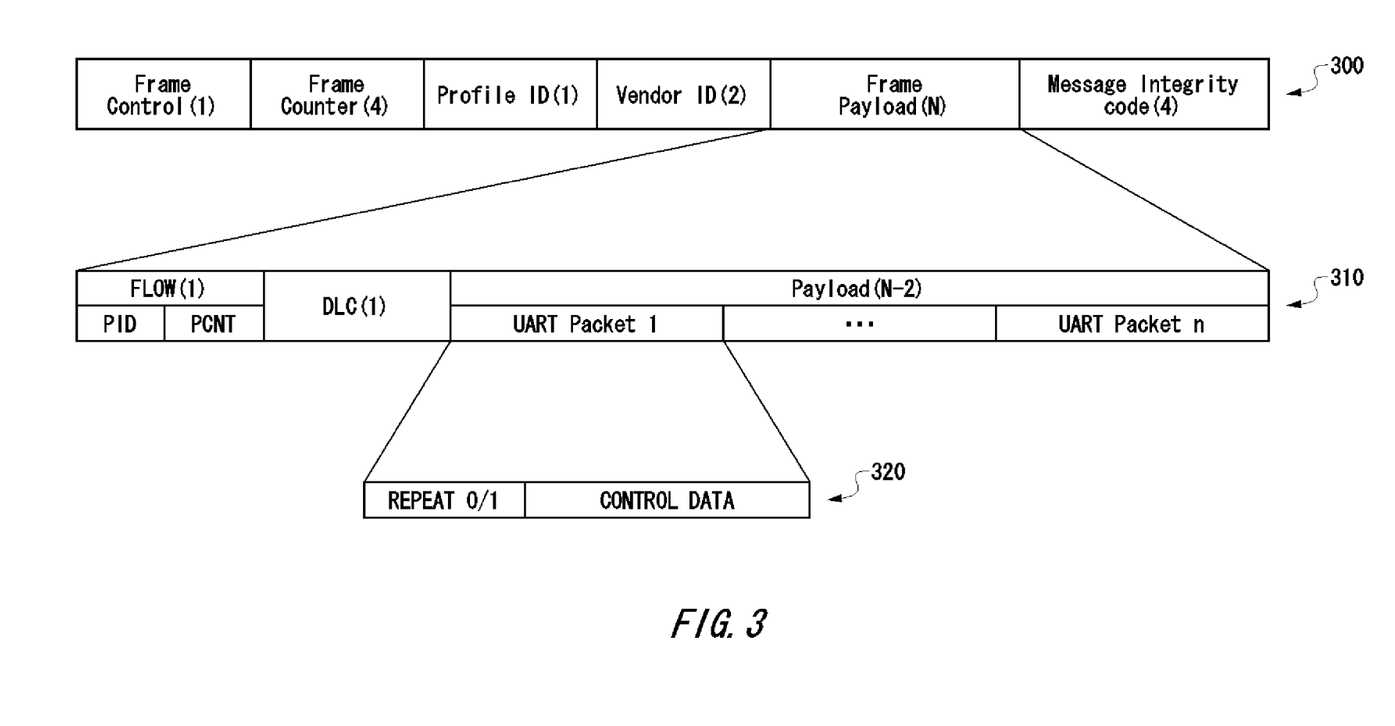
FIG. 3 shows a view illustrating an exemplary RF packet 300 that the radio communication module 100 and a radio communication module 200 transmit and receive.

FIG. 3 is a view illustrating an exemplary RF packet 300 that the radio communication module 100 and the radio communication module 200 transmit and receive. The RF packet 300 includes a Frame Control field that contains information for specifying the frame type, a Frame Counter field indicative of the frame counter, a Profile ID field for identifying the standard profile, a Vendor ID field for identifying the vendor, a Frame Payload field for the payload of the frame, and a Message Integrity code field for the message integrity sign.

The Frame Payload 310 includes a FLOW field, a DLC field, and a Payload field. The FLOW field includes a PID field and a PCNT field. The PID field contains information for identifying the data type of the Payload field. For example, the PID field contains information for identifying whether the data of the Payload field is indicative of data transmission or reception or another command. The PCNT field stores the value of the cyclic counter. The cyclic counter is counted by the communication control section 140 each time the data of the Payload field is sent out, and set to the PCNT field. This counter will be described in more detail later. The DLC is indicative of the data size of the Payload field. The Payload field stores one or more UART packets.

The UART packet 320 includes a control data field in which control data is stored, and a REPEAT field in which repeat information is stored. The repeat information will be described in more detail later. As used in the present embodiment, the so-called "payload" refers to the Frame Payload of the RF packet. The payload in the Frame Payload 310 is referred to as the UART packet in the descriptions of the present embodiment.

Figure 4:
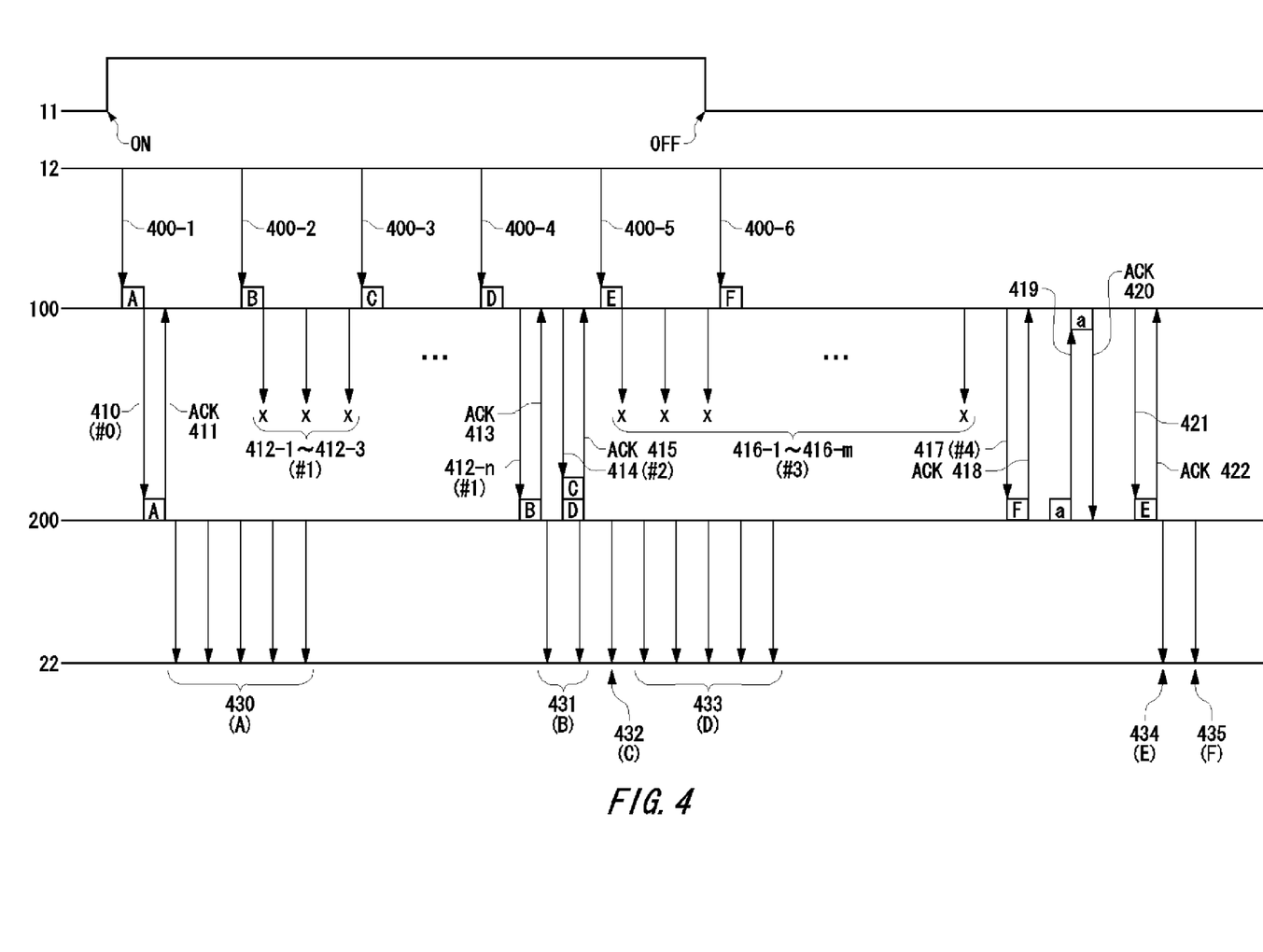
FIG. 4 shows a view illustrating an exemplary communication sequence between the radio communication module 100 and the radio communication module 200.

FIG. 4 is a view illustrating an exemplary communication sequence between the radio communication module 100 and the radio communication module 200. This figure shows an example of a communication sequence where the key on the input section 11 initially at an OFF status is turned ON by the user, and then turned OFF after the key was kept at the ON status for a certain period of time.

Upon detection of the key having been turned ON, the remote controller MPU 12 supplies control data 400-1 through 400-6 at predetermined time intervals to the radio communication module 100 in the form of an electric signal. Here, it is to be understood that the remote controller MPU 12 supplies the control data 400-1 through 400-5 having the same control contents associated with the operated key. Upon detection of the key having been turned OFF, the remote controller MPU 12 supplies the control data 400-6 indicative of a key break at the timing at which control data is supplied for the first time after the detection, thereby ending the supply of control data to the radio communication module 100.

The radio communication module 100 outputs the RF packet at 50 to 100 ms intervals on the basis of the control data 400 that is successively supplied. More specifically, in the radio communication module 100, the communication control section 140 creates a UART packet A containing the control data 400-1 and the payload with zero set in the PCNT field to electrically supply the resulting RF packet containing the payload to the communication section 180. The communication section 180 outputs the supplied RF packet as the RF signal 410. More specifically, the antenna section 186 radiates the received RF packet into space in the form of radio waves.

The radio communication module 200 allows the communication section 280 to receive the RF packet. More specifically, the antenna section 286 detects the RF signal in the form of radio waves in the air, so that the detected RF signal is demodulated as the RF packet in the RF communication circuit section 282.

The communication control section 240 checks the data of the RF packet received and then determines whether it has been successfully received as the data of the RF packet 300. For example, the communication control section 240 uses the data of the Message Integrity code field to determine whether it has been successfully received as the bit data of the RF packet. Furthermore, the communication control section 240 determines whether the bit data of each field in the RF packet received has a correct value as a field of the RF packet 300.

When the communication control section 240 determined that it was successfully received as the data of the RF packet 300, the radio communication module 200 accepts it as the RF packet containing the UART packet A. In this case, the communication control section 240 creates an acknowledge packet 411 or an acknowledge signal packet, which is an example of a response signal, and supplies it to the communication section 280. The communication section 280 outputs the supplied acknowledge packet 411 as the RF signal. The communication section 280 operates to output the RF signal generally in the same manner as the communication section 180 outputs the RF packet as the RF signal, and thus will not be described regarding its operation. Furthermore, the operation by which the communication section 180 detects the RF signal and the communication control section 140 extracts the resulting signal as the acknowledge packet 411 is substantially the same as the operation by which the communication section 280 detects the RF signal and the communication control section 240 extracts the resulting signal as the RF packet. Thus, the latter operation will not be explained again. Furthermore, in the descriptions that follow, other packets are sent or received in the same manner, and thus will not be explained again.

When the RF packet containing the UART packet A has been successfully received, the communication control section 240 extracts the control data 400-1 from the RF packet received and then supplies it to the controlled-device MPU 22 via the input/output section 220. Here, the communication control section 240 repeatedly supplies the control data 400-1 as a PWM modulated signal 430 to the controlled-device MPU 22. At this time, the communication control section 240 repeatedly supplies the PWM modulated signal to the controlled-device MPU 22 until the predetermined timeout period has elapsed or the next control data is received.

When the radio communication module 100 received the next control data 400-2 from the remote controller MPU 12, the communication control section 140 creates a UART packet B containing the control data 400-2 and the payload with one being set in the PCNT field. the radio communication module 100 outputs the RF packet containing the payload as the RF signal 412.

Here, suppose that the radio communication module 200 has not successfully received the RF signal 412-1. The factors that may disable the radio communication module 200 to successfully receive the RF signal can include the effects of external noise. For example, external noise may cause the signal strength of the RF signal to be relatively low, resulting in the demodulated bit data being different from the original bit data. It can be determined whether the signal was acquired as the correct bit data, for example, as described above, using check data such as the Message Integrity code field or by checking each field value of the RF packet.

When the RF signal 412-1 was not successfully received, the communication control section 240 outputs no acknowledge packet. Accordingly, the radio communication module 100 receives no acknowledge packet for the RF signal 412-1 from the radio communication module 200. When no acknowledge packet was received within the predetermined period since the RF signal 412-1 was output for the first time, the communication control section 140 re-delivers the same RF packet as the RF signal 412-2.

In this sequence, the radio communication module 200 has not successfully received the RF signal 412-2, either, and the radio communication module 100 can receive no acknowledge packet for the RF signal 412-2. Accordingly, the communication control section 140 re-delivers the same RF packet as the RF signal 412-3. As such, the communication control section 140 attempts to re-deliver the RF signal 412 until an acknowledge packet is received. Then, suppose that when the radio communication module 100 has output the RF signal 412 of the same RF packet n times, the radio communication module 100 has received an acknowledge packet 413 for the packet.

Here, the RF packet delivered from the communication section 180 is retained in the transmission buffer 154. Then, to re-deliver the RF packet, the communication control section 140 supplies the RF packet stored in the transmission buffer 154 to the communication section 180, thereby causing the communication section 180 to re-deliver the packet. That is, the transmission buffer 154 functions as a buffer for buffering control data to be transmitted in the form of an RF signal from the communication section 180. Then, when no response signal was received, the communication control section 140 causes the communication section 180 to re-deliver as the RF signal the control data stored in the transmission buffer 154 until the response signal is received.

As can be seen from above, the control data 400-2 can be re-sent until the acknowledge packet is received and thereby transferred to the controlled device 20. On the other hand, while the key is in an ON status, the remote controller MPU 12 periodically supplies the control data 400 to the radio communication module 100. Accordingly, while the communication control section 140 is re-delivering the RF signal 412 of the UART packet B, the radio communication module 100 is supplied with the next control data 400-3 and the control data 400-4 that follows the data 400-3. In this case, the communication control section 140 buffers a UART packet C containing the control data 400-3 and a UART packet D containing the control data 400-4 in the data buffer 152.

Then, upon reception of the acknowledge packet 413 for the RF signal 412-n from the radio communication module 200, the communication control section 140 creates the RF packet that contains the UART packet C and the UART packet D stored in the data buffer 152 as well as the payload with two being set in the PCNT field. In this case, as shown in FIG. 3, the communication control section 140 produces the RF packet that has the UART packet 1 containing the control data 400-3 and the UART packet 2 containing the control data 400-4, which are arranged in that order. Then, the communication control section 140 causes the communication section 180 to output the produced RF packet as the RF signal 414. When the radio communication module 200 has successfully received the RF signal 414, an acknowledge packet 415 is returned from the radio communication module 200. When having received the acknowledge packet 415, the radio communication module 100 successively creates RF packets and attempts to successively send them each time the control data 400 is supplied from the remote controller MPU 12.

On the other hand, when having successfully received the RF signal 412-n as the RF packet, the radio communication module 200 repeatedly supplies the signal as the PWM modulated signal 431 to the controlled-device MPU 22 in accordance with the control data 400-2 extracted from the RF packet. Furthermore, when having successfully received the RF signal 414, the radio communication module 200 extracts the control data 400-3 and the control data 400-4 from the RF packet of the RF signal 414. Then, after having supplied the PWM modulated signal 432 to a controlled-device MPU based on the control data 400-3, the radio communication module 200 supplies the PWM modulated signal 433 to the controlled-device MPU based on the control data 400-4.

As such, after the communication section 180 has output the control data as an RF signal, the communication control section 140 may receive no response signal from the controlled device 20 indicating that the controlled device 20 has received the control data. In this case, the communication control section 140 causes the communication section 180 to re-deliver the control data as the RF signal until the response signal is received. Then, the data buffer 152 buffers one or more pieces of new control data to be transmitted to the controlled device 20 until a response signal is received after the control data was output. Then, upon reception of the response signal from the controlled device 20, the communication control section 140 causes the communication section 180 to output the one or more pieces of new control data stored in the data buffer 152 in the form of the RF signal. The RF signal of the acknowledge packet according to the present embodiment is an example of the response signal. Furthermore, the acknowledge packet according to the present embodiment is an acknowledge signal at the network layer level, and the buffered data is at a higher layer than the network layer.

As can be seen from above, the radio communication module 100 allows the control data that could not be received by the controlled device 20 to be buffered on the side of the remote controller 10. Then, when the remote controller 10 is ready for reception, the buffered one or more pieces of control data can be collectively sent at a time. It is thus possible to transfer the control data to the controlled device 20 exactly as the user operating on the remote controller 10 intends to.

For example, consider a case where the controlled device 20 is an apparatus such as a television set that has a display device, and the user tries to make a choice among several alternatives by moving the cursor within a GUI menu displayed on the display device. At this time, the user may operate the key four times on the remote controller to move the cursor leftward, leftward again, upward, and upward again in that order. Suppose that during these operations, the packet associated with the first operation is delayed, for example, due to noise in the communication environment, so that the controlled device cannot receive the packet associated with the second operation for the cursor to move leftward and the packet associated with the third operation for the cursor to move upward.

When the control data supplied from the remote controller MPU is not buffered, the controlled device moves the cursor leftward corresponding to the first operation and upward corresponding to the fourth operation, then ending the cursor movement. As a result, the controlled device is not operated as the user intended to. On the other hand, buffering of the control data by the RF communication system 1 ensures that the radio communication module 100 can send to the controlled device 20 the packet associated with the second operation for the cursor to move leftward and the packet associated with the third operation for the cursor to move upward. Accordingly, the controlled device 20 can operate only in accordance with the control data transmitted from the radio communication module 100, thereby working exactly as the user desires.

Furthermore, according to the RF communication system 1, when a plurality of pieces of new control data are stored in the data buffer 152, the communication control section 140 causes the communication section 180 to output as the RF signal a collection of the plurality of pieces of new control data. More specifically, when a plurality of pieces of new control data are stored in the data buffer 152, the communication control section 140 creates one packet of data which contains the plurality of pieces of new control data as a payload and causes the communication section 180 to output the data as the RF signal. Accordingly, the radio communication module 100 can send the plurality of pieces of buffered control data as a collective packet in a short period of time. Furthermore, the controlled device 20 can extract the plurality of pieces of control data from one packet and thus swiftly provide control according to the multiple pieces of control data. It is thus possible to provide an improved response to control operation.

Referring back to FIG. 4, a description will be made to the communication sequence that follows. The communication control section 140 creates a UART packet E containing the control data 400-5, and creates an RF packet from the payload containing the UART packet E with three being set in the PCNT field. Then, the communication control section 140 causes the communication section 180 to output the produced RF packet as the RF signal 416. In this communication sequence, the radio communication module 100 can receive no acknowledge packet for any RF signal 416, so that there will occur a timeout for the RF transmission when the RF signal 416 is output m times. The timeout for the RF transmission may occur approximately in one second.

When a timeout occurs for the RF signal 416, the communication control section 140 creates the RF packet from the payload containing a retained UART packet F with four being set in the PCNT field and causes the communication section 180 to output the packet as the RF signal 417. This can be done because the data buffer 152 has stored the UART packet F that contains the control data 400-6 supplied from the remote controller MPU 12 after the control data 400-5. The radio communication module 200 successfully receives the RF signal 417 and the radio communication module 100 receives the RF signal 418 of the acknowledge packet.

As such, when no response signal was received, the communication control section 140 causes the communication section 180 to re-deliver the control data as the RF signal, until the response signal is received, in the condition that the period of time during which no response signal is received does not exceed a predetermined value. At this time, the UART packet stored in the transmission buffer 154 may be re-delivered from the communication section 180 as the RF signal until the response signal is received. Then, when the period of time during which no response signal is received has exceeded the predetermined value, the communication control section 140 causes the communication section 180 to output one or more pieces of new control data as the RF signal. At this time, the communication control section 140 can cause the communication section 180 to output as the RF signal the one or more pieces of new control data stored in the data buffer 152. Furthermore, when no response signal was received, the communication control section 140 may cause the communication section 180 to re-deliver the control data at predetermined time intervals until the response signal is received.

Here, as for the condition that the period of time during which no response signal is received does not exceed a predetermined value, it does not necessarily refer to a time length but may also refer to the number of times of re-delivery. For example, when re-deliveries are made at predetermined time intervals, the communication control section 140 may cause the communication section 180 to re-deliver the control data as the RF signal, until the response signal is received, in the condition that the number of times of re-delivery does not exceed the predetermined number of times. The control section 140 may cause the communication section 180 to output as the RF signal one or more pieces of new control data stored in the data buffer 152 in the condition that the number of times of re-delivery has reached the predetermined number of times. As can be seen from above, the setting of the timeout for re-delivery would make it possible to prevent a new user operation from being not sent to the controlled device 20 for a long period of time.

As already explained above, the RF signal 410, the RF signal 412, the RF signal 414, the RF signal 416, and the RF signal 417, which are delivered in a time-sharing manner, have a PCNT field that is set at 0, 1, 2, 3, and 4, respectively. The value of the PCNT field indicates the order in which the RF signal is output from the radio communication module 100 in a time-sharing manner. That is, the communication control section 140 creates the payload with the order data indicative of the transmission order attached to the control data to be successively sent to the controlled device 20. Then, the communication section 180 successively outputs as the RF signal the payload created by the communication control section 140. Accordingly, the communication control section 240 can read out the value of the PCNT field from the payload extracted from each RF signal. Based on the value of the PCNT field, the communication control section 240 can determine the order of the RF signals to be transmitted from the remote controller 10.

For example, in this communication sequence, the value of the PCNT field extracted from the successfully received RF signal 417 is four, while the value of the PCNT field extracted from the RF packet that has been previously successfully received is two. Accordingly, the communication control section 240 can determine that the RF signal with the value of the PCNT field being three is transmitted until the RF signal 417 is received after the RF signal 414 was received. Then, the communication control section 240 creates a request packet for requesting the control data to be transmitted as the RF signal. At this time, the communication control section 240 creates a request packet that contains three as payload "a", which is the value of the PCNT field of a signal that have not yet been received. Then, the communication control section 240 causes the communication section 280 to output the request packet as the RF signal 419. When the RF signal 419 has been successfully received, the radio communication module 100 returns the RF signal 420 of the acknowledge packet to the radio communication module 200.

Then, the communication control section 140 causes the communication section 180 to output as the RF signal 421 the RF packet that contains the requested UART packet E at least as a payload. As such, the RF communication system 1 allows the communication control section 140 to re-deliver the UART packet, which could not be sent due to a timeout, to the controlled device 20.

That is, when the request signal for the controlled device 20 to request the control data is received by the communication section 180, the communication control section 140 causes the communication section 180 to output the requested control data as the RF signal. At this time, the RF packet stored in the transmission buffer 154 may be output as the RF signal. Accordingly, when the period of time during which no response signal is received has exceeded the predetermined value, the communication control section 140 may cause the communication section 180 to output a new RF packet as the RF signal while another RF packet is held in the transmission buffer 154. Then, when the UART packet is re-delivered to the controlled device 20, the communication control section 140 may cause the communication section 180 to output as the RF signal the RF packet stored in the transmission buffer 154. Note that to reproduce the RF packet from the UART packet, the communication control section 140 may re-create an RF packet from the UART packet stored in the data buffer 152.

When the radio communication module 200 has successfully received the RF signal 421, the radio communication module 200 returns an acknowledge packet to the radio communication module 100 via the RF signal 422. Then, the communication control section 240 supplies the PWM modulated signal 434 derived from the control data 400-5 to the controlled-device MPU 22, and then supplies the PWM modulated signal 435 derived from the control data 400-6 to the controlled-device MPU 22.

As such, the communication control section 140 can add sequential order data to one or more pieces of UART data, which should be received from the remote controller MPU 12 and transmitted in one packet, and transmit the resulting data. It is therefore possible for the controlled device 20 to detect the existence of one of those packets that were transmitted from the remote controller 10 but not received. This makes it possible for the controlled device 20 to take appropriate action based on the results detected.

For example, suppose that when cursor control is provided to the aforementioned menu, the controlled device could not receive the packet for the second operation to move the cursor to the left. If no order data is attached to packets, the controlled device cannot detect the existence of one of the packets that was not received. Even if the packet could not be successfully received before but done later, the controlled device cannot properly determine the control order. Accordingly, for example, the cursor might be moved to the left based on the first operation and then upward based on the third operation. This would result in the controlled device being operated in a manner different from the user's intention.

On the other hand, according to the RF communication system 1, the controlled device 20 receives the packet for the third operation to move the cursor to the left, and then can request the packet for the second operation to move the cursor to the left, thereby receiving the packet for the second operation. Then, the controlled device 20 moves the cursor to the left on the basis of the second operation, and then can move the cursor upward on the basis of the third operation. As such, the controlled device 20 can operate in the order that the user desired.

Note that when having successfully received the RF signal, the communication control section 240 holds the value of the PCNT field extracted from the RF signal in the buffer section 250. This makes it possible to compare the value of the PCNT field extracted from the successfully received subsequent RF signal with the value held in the buffer section 250, thereby identifying the value of the PCNT field of an RF signal that could not be received. More specifically, when having successfully received the RF signal 414, the communication control section 240 holds the value of the PCNT field extracted from the RF signal 414 in the buffer section 250. Then, the communication control section 240 can identify the value (3) of the PCNT field of an RF signal that could not be received, on the basis of the result of comparing the value of the PCNT field extracted from the successfully received subsequent RF signal 417 with the value of the PCNT field stored in the buffer section 250.

As described above, upon reception of a response signal from the controlled device 20, the communication control section 140 creates a payload, which has order data attached to a collection of one or more pieces of new control data stored in the data buffer 152, and causes the communication section 180 to output the resulting data as the RF signal. In particular, when a plurality of pieces of new control data are stored in the data buffer 152, the communication control section 140 creates a payload with one piece of order data attached to the collection of a plurality of pieces of new control data and then causes the communication section 180 to output the resulting signal as the RF signal. That is, the communication control section 140 can create a one-packet RF packet, which contains the plurality of pieces of new control data and one piece of order data as a payload, and then cause the communication section 180 to output the resulting signal as the RF signal.

Note that the transmission buffer 154 may hold the RF packet until the response signal is received. Then, upon reception of the response signal, the communication control section 140 may delete the RF packet corresponding to the response signal from the transmission buffer 154. To create the payload to be transmitted to the controlled device 20, the communication control section 140 attaches, as the order data, to the UART packet the counter value incremented each time the payload is created, thereby creating the payload. Note that by way of example, when the PCNT field has 4-bit length data, the PCNT field can be set at 0 to 15. In this case, the PCNT field can be provided with the value of a cyclic counter that goes back to zero after 15.

Furthermore, on the side of the controlled device 20, the first communication control section 240 extracts the payload from each of the plurality of RF signals which the communication section 280 successively received. Then, on the basis of the order data contained in each of the plurality of extracted payloads, the communication control section 240 determines whether any control data exists which has been unsuccessfully received from the radio communication module 100. When having determined that some control data exists which has been unsuccessfully received from the second radio communication module, the communication control section 240 causes the communication section 280 to output a request signal for requesting the unsuccessfully received control data. When having determined that control data exists which has been unsuccessfully received from the radio communication module 100, the communication control section 240 identifies the order corresponding to the control data unsuccessfully received from the second radio communication module, on the basis of the order data contained in each of the plurality of extracted payloads. Then, the communication control section 240 causes the communication section 280 to output the request signal indicative of a specific order as the RF signal.

Figure 5:
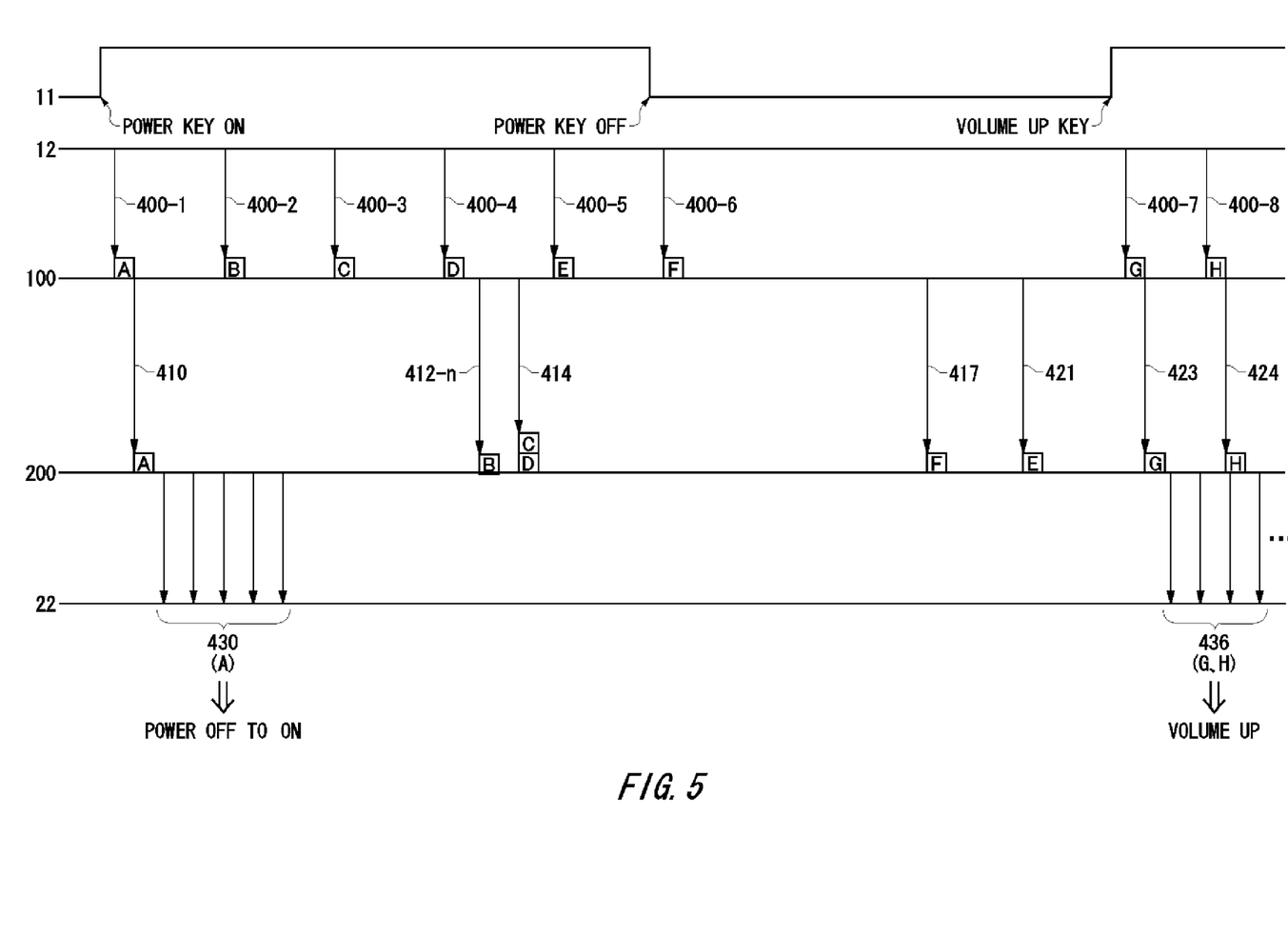
FIG. 5 shows a view illustrating another exemplary communication sequence.

FIG. 5 is a view illustrating another exemplary communication sequence. This figure illustrates particularly the repeat information contained in the UART packet. The description in relation to this communication sequence will be focused particularly on the points different from those of the communication sequence that has been explained in relation to FIG. 4. In particular, to clarify the operation of the RF communication system 1 relating to the repeat information, this figure does not indicate the sequence for the re-delivered RF signal, acknowledge signal, and request packet. It is to be understood that these omitted signals are also communicated between the radio communication module 100 and the radio communication module 200 in the same manner as in FIG. 4.

The repeat information is indicative of whether to repeatedly control the function of the controlled device 20 that is to be controlled on the basis of the control data. By way of example, the repeat enabling information indicating that control should be repeated is attached to the control data such as the Volume UP key data for controlling the volume. On the other hand, the repeat disabling information indicating that control should not be repeated is attached to the control data indicative of the ON/OFF control on the power of the controlled device 20. In particular, when ON/OFF control is provided to the power using the toggle by a specific user operation, the repeat disabling information is essential. As will be described later, the repeat information controls the output of the PWM modulated signal from the radio communication module 100 to the controlled-device MPU 22. The repeat information is stored in advance in the repeat information storage section 156 corresponding to the function of the controlled device 20 to be controlled. Note that the repeat information storage section 156 may store in advance the repeat information corresponding to a plurality of keys. For example, the repeat information storage section 156 may store in advance the repeat information corresponding to a plurality of pieces of key identification information.

In the communication sequence of the figure, suppose that the power key is pressed as a key control on the input section 11. When depressing the power key has caused the control data 400-1 to 400-5 associated with the depression of the power key to be supplied to the controlled device 20, the controlled device 20 turns ON the power if the power was in an OFF status. On the other hand, if the power was in an ON status, the power is turned OFF. It is thus supposed that depressing the same power key provides toggle control to the power. The communication control section 140 attaches the repeat disabling information to the control data 400-1 through 400-5 corresponding to the key control for turning ON the power. More specifically, the REPEAT field of the UART packet is provided with zero, which indicates that the repetition is disabled. At this time, the communication control section 140 sets, in the REPEAT field, the repeat information that has been stored in the repeat information storage section 156 corresponding to the function associated with the operated key. Note that when the repeat information storage section 156 has stored the repeat information corresponding to the key identification information, the communication control section 140 may set, in the REPEAT field, the repeat information stored in the repeat information storage section 156 corresponding to the key identification information of the operated key.

Referring to the operation of the controlled device 20, the communication control section 240 extracts the UART packet on the basis of the RF signal 410. Furthermore, the communication control section 240 extracts the repeat information from the REPEAT field of the UART packet. The REPEAT field of the UART packets A to E is set at 0, indicating that repeat control is to be disabled. As in the communication sequence of FIG. 4, the communication control section 240 repeatedly supplies the PWM modulated signal 430 on the basis of the UART packet A to the controlled-device MPU 22. The communication control section 240 does not need to control the PWM modulated signal based on the first UART packet since the key is turned ON according to the repeat information. Furthermore, as in the communication sequence of FIG. 4, the RF signal of the UART packet B is delayed by the re-transmission control and then received with the RF signal 412-n. There occurs a timeout for the transmission of the PWM modulated signal 430 to the controlled-device MPU 22 before the RF signal 412-n is received, and the communication control section 240 stops outputting the PWM modulated signal 430.

Here, when the RF signal 412-n is received, the communication control section 240 extracts the repeat information from the REPEAT field of the UART packet B. When having extracted zero indicative of the repeat disabling from the REPEAT field, the communication control section 240 determines whether the output of the PWM modulated signal 430 has been stopped and the control data of the UART packet B and the control data of the UART packet A received just before it indicate the same control contents. When the PWM modulated signal 430 has already stopped outputting and the same control contents are found, the communication control section 240 does not output the PWM modulated signal to the controlled-device MPU 22.

When having received the RF signal 414, the communication control section 240 also makes the same decision as for the RF signal 412-n and thus does not allow the PWM modulated signal to be output to the controlled-device MPU 22. This also holds true for the UART packets F from the RF signal 417 and the UART packet E from the RF signal 421.

As such, the communication control section 140 creates the UART packet with the control data to be transmitted to the controlled device 20, where the control data is provided with the repeat information indicative of whether to repeatedly control the function of the controlled device 20 that is to be controlled on the basis of the control data. Then, the communication section 180 successively outputs as the RF signal the UART packet created by the communication control section 140. The repeat information storage section 156 stores the repeat information in advance corresponding to the function of the controlled device 20. The communication control section 140 attaches to the control data the repeat information, which is stored in the repeat information storage section 156 corresponding to the function controlled by the control data that is to be transmitted to the controlled device 20. The UART packet is thus created.

On the side of the controlled device 20, the input/output section 230 outputs the control data contained in the extracted UART packet to the control processing section 23 included in the controlled device 20. More specifically, the input/output section 230 outputs the control data to the control processing section 23 as an electric signal. Here, the communication control section 240 does not cause the input/output section 230 to output the control data contained in the second UART packet when the time from the reception of the first RF signal from the first communication section 180 to the next reception of the second RF signal has exceeded a predetermined length of time. This is done in the condition that the control data contained in the first UART packet extracted from the first RF signal and the control data contained in the second UART packet extracted from the second RF signal indicate the same control contents, and the repeat information contained in the second UART packet indicates that control is not to be provided repeatedly.

As used herein, the "predetermined length" is defined to be longer than the time interval at which the communication section 180 delivers the RF signal. More specifically, as described above, the "predetermined length" may be a time length in which the PWM modulated signal continues to be output. In this case, it is determined whether the time from the reception of the first RF signal to the next reception of the second RF signal has exceeded the predetermined length. This determination is substantially equivalent to the determination of whether the PWM modulated signal still continues to be output when the second RF signal is newly received.

Now, suppose that as described above, there has occurred a retry of transmission of the RF signal causing a delay until the next RF signal is successfully received, and the radio communication module 200 has received the delayed RF signal after having stopped once the PWM modulated signal based on the immediately preceding RF signal. In this case, when the PWM modulated signal based on the delayed RF signal is output to the controlled-device MPU, the controlled-device MPU would determine, even though the user has only continued to press the key, that the key was once turned OFF and then turned ON again. Thus, the controlled device could perform the operation that would be realized by the key being turned ON twice. This would result in the control that the user does not intend. That is, the controlled device cannot determine whether the key continued to be depressed or it was depressed again.

In particular, when one key is assigned the control by the toggle to operate the function of the controlled device, a delay in the RF signal would cause the controlled device to perform the toggle operation twice. The controlled device performing the toggle operation twice would cause the current status to go back to the original status, which may be totally against the control that the user intended to provide. In particular, in the case of the key control for the toggle operation to turn ON/OFF the power, one key control action would cause the power to change from an OFF state to an ON state, then immediately after that, to an OFF state. The result of this control does not reflect the control the user intends to provide and as well causes a great load on the controlled device because the power is turned ON/OFF in a short period of time. There is also another case where the key is controlled for the toggle operation to turn ON/OFF the display of the menu. In this case, one key control action may cause the menu to disappear and then appear, immediately resulting in the menu to disappear. Additionally, in the case of a key control action for the toggle operation to open or close the tray on which an external storage medium is placed, one key control action may cause the tray to start to be closed while it is still being opened.

In contrast to this, the RF communication system 1 transmits the UART packet to which the repeat information is attached depending on the function. Accordingly, the radio communication module 200 can determine on the basis of the repeat information whether repeated control is unfavorably provided to the function such as for turning ON/OFF the power, for displaying or not displaying a menu, or for closing and opening the tray. It is thus possible not to allow such control to be executed successively. Note that as used herein, the power ON state can be an operable status, whereas the power OFF state can be, for example, a standby state in which an instruction from the remote controller 10 can be at least received.

As such, the communication control section 140 can produce the UART packet in which the repeat information indicating that no repeated control is allowed is attached to the control data for providing toggle control to the function of the controlled device 20. More specifically, the communication control section 140 creates the UART packet in which the repeat information indicating that control is not to be repeated is attached to the control data for providing toggle control to the power of the controlled device 20.

On the other hand, for example, when compared with the ON/OFF control of the power, the control operation such as for turning UP or DOWN the volume may be repeatedly controlled without causing the user to have a seriously unusual feeling. The REPEAT field of the UART packet for such an operation is set at 1 indicating that repeated control is allowed.

Now referring back to the flow of FIG. 5, suppose that the power key is turned OFF and then the volume UP key is operated. In this case, the remote controller MPU 12 periodically supplies the control data 400-7, the control data 400-8, and so on to the radio communication module 100. The communication control section 140 creates the UART packet G that contains the control data 400-7 with the REPEAT field set at one, and then allows the communication section 180 to output the RF packet containing the UART packet G as the RF signal 423. Here, the control data extracted from the RF signal 423 has control contents that are different from those of the power ON/OFF control data that was received immediately before. Accordingly, when the radio communication module 200 received the RF signal 423, the communication control section 240 starts to output the PWM modulated signal 436. This allows the controlled-device MPU 22 to start controlling to turn UP the volume. Note that the communication control section 240 may start to output the PWM modulated signal 436 in the condition that the REPEAT field is set at one.

The same holds true for the UART packet H containing the control data 400-8; the radio communication module 200 continues to output the PWM modulated signal 436 upon reception of the RF signal 424. Even when the arrival of the RF signal 424 of the UART packet H is delayed as with the UART packet B, the REPEAT field being set at one allows the communication control section 240 to restart to output the PWM modulated signal 436.

Note that as shown in FIG. 3, in the present embodiment, the repeat information is stored in each of one or more UART packets. That is, upon reception of a response signal from the controlled device 20, the communication control section 140 creates the payload that contains a collection of one or more pieces of new control data and the repeat information, and then allows the communication section 180 to output the resulting signal as the RF signal. As described above, the one or more pieces of new control data may be one that has been buffered in the data buffer 152. Furthermore, when a plurality of pieces of new control data are stored in the data buffer 152, the communication control section 140 creates the payload that has the collection of plurality of pieces of new control data each attached with the repeat information and causes the communication section 180 to output the resulting signal as the RF signal. As such, the communication control section 140 can create the one-packet RF packet that contains the plurality of pieces of new control data and the repeat information as the payload, and cause the communication section 180 to output the resulting signal as the RF signal. Accordingly, the RF communication system 1 can collectively transmit the pieces of repeat information associated with the respective pieces of control data.

The radio communication module 200 on the side of the controlled device 20 or the controlled-device MPU 22 may pre-store the repeat enabling/disabling information associated with the respective pieces of control data. Then, depending on the control data received, the radio communication module 200 or the controlled-device MPU 22 may be able to determine whether repeated control is enabled or disabled. However, such a configuration increases the complexity of the processing software on the side of the radio communication module 200 or the controlled-device MPU 22. That is, the present embodiment is more advantageous than this configuration in that the processing software for implementing radio communications can be reduced in complexity.

While the embodiments of the present invention have been described, it is to be understood that the technical scope of the present invention is not limited to that of the aforementioned embodiments. It will be obvious to those skilled in the art that various changes and modifications may be made to the aforementioned embodiments. It is also obvious from the appended claims that all such changes and modifications fall within the true spirit and scope of the present invention.

It should be noted that the order of execution of each process such as an operation, a procedure, a step, and a stage in the device, system, program, and method, which are shown in the appended claims, the specification, and the drawings can be implemented in an arbitrary order unless otherwise explicitly specified by "prior to" or "before" or the output from the preceding processing is employed in the subsequent processing. It is also to be understood that the terms "first", "next", or the like may be used for convenience of illustration in the operation flow in the appended claims, the specification, and the drawings; but it is not necessarily meant that the operation should be carried out in that order.

What is claimed is:

1. A radio communication module for receiving control data for controlling a controlled device by radio communications, comprising:
   a first communication section for receiving a radio signal;
   a first communication control section for extracting transmission data on a basis of the radio signal received by the first communication section, the transmission data including the control data and repeat information indicative of whether to repeatedly control a function of the controlled device controlled by the control data; and an output section for outputting control data contained in the extracted transmission data, to a control processer included in the controlled device, wherein, when a period of time from when a first radio signal is received until a second radio signal is newly received exceeds a predetermined length and on the condition that control data contained in first transmission data extracted from the first radio signal and control data contained in second transmission data extracted from the second radio signal indicate the same substance of control, and that the repeat information contained in the second transmission data indicates that no repeated control is allowed, the first communication section prohibits output of the control data contained in the second transmission data from the output section.

2. A radio system comprising:

the radio communication module according to claim 1 as a first radio communication module; and a second radio communication module for sending the control data for controlling the controlled device by radio communications to provide remote control to the controlled device, the second radio communication module being in radio communication with the first radio communication module and including:

a communication control section for creating the transmission data by adding the repeat information to the control data to be transmitted to the controlled device; and a communication section for successively outputting the transmission data created by the communication control section via a radio signal.

3. The radio system according to claim 2, further comprising a remote controller that includes:

the second radio communication module; and an input section for receiving a user input, wherein the communication control section creates the transmission data by adding the repeat information to the control data corresponding to the user input.

4. The radio system according to claim 2, wherein the second radio communication module further includes a repeat information storage section in which the repeat information is stored in advance in association with the function of the controlled device, and wherein the communication control section creates the transmission data by adding the repeat information to the control data to be transmitted to the controlled device with the repeat information being stored in the repeat information storage section in association with the function controlled by the control data.

5. The radio system according to claim 2, wherein the communication control section creates transmission data by adding repeat information, indicating that no repeated control is allowed, to the control data for providing toggle control to a function of the controlled device.

6. The radio system according to claim 5, wherein the communication control section creates transmission data by adding repeat information, indicating that no repeated control is allowed, to the control data for providing toggle control to a power of the controlled device.

7. The radio system according to claim 2, wherein the second radio communication module further includes a transmission buffer for storing therein the transmission data, and wherein, to re-transmit the transmission data to the controlled device, the communication control section causes the communication section to output the transmission data stored in the transmission buffer via a radio signal.

8. The radio system according to claim 7, wherein the communication section also receives a response signal from the controlled device indicating that the controlled device received the control data, and wherein, when the response signal is not received, the communication control section causes the communication section to re-deliver via a radio signal the transmission data stored in the transmission buffer until the response signal is received.

9. The radio system according to claim 8, wherein, when the response signal is not received and on the condition that a period of time during which the response signal is not received does not exceed a predetermined value, the communication control section causes the communication section to re-deliver the transmission data stored in the transmission buffer via a radio signal until the response signal is received, and wherein, when the period of time during which the response signal is not received exceeds the predetermined value, the communication control section causes the communication section to output via a radio signal new transmission data created from new control data.

10. The radio system according to claim 9, wherein, when the period of time during which the response signal is not received exceeds the predetermined value, the communication control section causes the communication section to output the new transmission data via a radio signal with the transmission data stored in the transmission buffer.

11. The radio system according to claim 8, wherein the second radio communication module further includes a data buffer for buffering one or more pieces of new control data to be transmitted from when the control data is output until the response signal is received, and wherein, when the response signal is received from the controlled device, the communication control section creates transmission data containing a collection of the one or more pieces of new control data stored in the data buffer and the repeat information, and then causes the communication section to output the resultant transmission data via a radio signal.

12. The radio system according to claim 11, wherein, when a plurality of pieces of new control data are stored in the data buffer, the communication control section creates transmission data by collecting the plurality of pieces of new control data to each of which the repeat information is added, and then causes the communication section to output the resultant transmission data via a radio signal.

13. The radio system according to claim 12, wherein the communication control section creates one-packet transmission data containing the plurality of pieces of new control data and the repeat information as a payload, and then causes the communication section to output the resultant transmission data via a radio signal.

14. The radio system according to claim 3, wherein the input section includes a plurality of key sections operated by a user and which are associated with a plurality of functions of the controlled device, and wherein, when a user operates at least any one of the plurality of key sections, the communication control section creates the transmission data by adding the repeat information, set in advance for the function associated with the operated key section, to the control data corresponding to the key section.

* * * * *